(12) United States Patent
Hoshiba

(10) Patent No.: US 11,001,100 B2
(45) Date of Patent: May 11, 2021

(54) PNEUMATIC TIRE

(71) Applicant: The Yokohama Rubber Co., LTD., Tokyo (JP)

(72) Inventor: Takashi Hoshiba, Hiratsuka (JP)

(73) Assignee: The Yokohama Rubber Co., LTD.

( * ) Notice: Subject to any disclaimer, the term of this patent is extended or adjusted under 35 U.S.C. 154(b) by 64 days.

(21) Appl. No.: 16/095,674

(22) PCT Filed: Mar. 31, 2017

(86) PCT No.: PCT/JP2017/013665
§ 371 (c)(1),
(2) Date: Oct. 22, 2018

(87) PCT Pub. No.: WO2017/183424
PCT Pub. Date: Oct. 26, 2017

(65) Prior Publication Data
US 2019/0152259 A1 May 23, 2019

(30) Foreign Application Priority Data
Apr. 22, 2016 (JP) .............................. JP2016-086133

(51) Int. Cl.
*B60C 19/00* (2006.01)
*B60C 5/00* (2006.01)
(Continued)

(52) U.S. Cl.
CPC .............. *B60C 5/002* (2013.01); *B60C 5/142* (2013.01); *B60C 19/002* (2013.01); *B29D 30/0061* (2013.01)

(58) Field of Classification Search
CPC ................................................... B60C 19/002
See application file for complete search history.

(56) References Cited

U.S. PATENT DOCUMENTS

2006/0231185 A1* 10/2006 Tanno .................. B60C 19/002
152/450
2009/0277549 A1 11/2009 Tanno
(Continued)

FOREIGN PATENT DOCUMENTS

| CN | 1829612 | 9/2006 |
|---|---|---|
| CN | 108349306 | 7/2018 |

(Continued)

OTHER PUBLICATIONS

Machine Translation: JP-2008254339-A; Kanzawa, Satoshi; (Year: 2020).*
(Continued)

*Primary Examiner* — Kendra Ly
(74) *Attorney, Agent, or Firm* — Thorpe North & Western

(57) ABSTRACT

Provided is a pneumatic tire, which includes a tread portion having an annular shape and extending in a tire circumferential direction, a pair of sidewall portions disposed on both sides of the tread portion, a pair of bead portions disposed on inner sides of the pair of sidewall portions in a tire radial direction, and a band-like sound absorbing member bonded to an inner surface of the tread portion along the tire circumferential direction. The band-like sound absorbing member includes a plurality of cuts in an outer circumferential surface of the band-like sound absorbing member. At least one end of each of the cuts terminates within the band-like sound absorbing member.

10 Claims, 5 Drawing Sheets

(51) Int. Cl.
 B60C 5/14 (2006.01)
 B29D 30/00 (2006.01)

(56) References Cited

U.S. PATENT DOCUMENTS

| | | | |
|---|---|---|---|
| 2015/0306922 A1* | 10/2015 | Kim | .................. B60C 19/002 152/157 |
| 2016/0288588 A1 | 10/2016 | Tanno | |
| 2016/0339749 A1* | 11/2016 | Yukawa | ................ B60C 19/002 |
| 2017/0297281 A1 | 10/2017 | Yukawa et al. | |
| 2017/0305210 A1 | 10/2017 | Yukawa et al. | |
| 2018/0200972 A1 | 7/2018 | Yukawa et al. | |
| 2018/0200976 A1 | 7/2018 | Yukawa et al. | |
| 2018/0200977 A1 | 7/2018 | Yukawa et al. | |
| 2018/0207998 A1 | 7/2018 | Yukawa et al. | |
| 2018/0319224 A1 | 11/2018 | Hoshiba | |

FOREIGN PATENT DOCUMENTS

| | | |
|---|---|---|
| EP | 3 009 260 | 4/2016 |
| JP | 2006-347230 | 12/2006 |
| JP | 2008-174080 | 7/2008 |
| JP | 2008-254339 | 10/2008 |
| JP | 2008254339 A * | 10/2008 |
| JP | 2009-023548 | 2/2009 |
| JP | 4281874 | 6/2009 |
| JP | 5267288 | 8/2013 |
| WO | WO 2005/012007 | 2/2015 |
| WO | WO 2015/076380 | 5/2015 |
| WO | WO 2015/118707 | 8/2015 |
| WO | WO 2016/060229 | 4/2016 |
| WO | WO 2016/060234 | 4/2016 |
| WO | WO 2016/060235 | 4/2016 |
| WO | WO 2016/060236 | 4/2016 |
| WO | WO 2016/060239 | 4/2016 |
| WO | WO 2016/060244 | 4/2016 |
| WO | WO 2017/077893 | 5/2017 |

OTHER PUBLICATIONS

International Search Report for International Application No. PCT/JP2017/013665 dated Jun. 27, 2017, 4 pages, Japan.

* cited by examiner

PNEUMATIC TIRE

TECHNICAL FIELD

The present technology relates to a pneumatic tire, and more particularly relates to a pneumatic tire, which has cuts formed in an outer circumferential surface of a band-like sound absorbing member bonded to a tire inner surface so that the band-like sound absorbing member can be deformed in accordance with an increase in outer diameter of the tire at the time of inflation of the tire, the tension generated in the band-like sound absorbing member can be alleviated, the durability of the band-like sound absorbing member can be improved, the heat dissipation from the band-like sound absorbing member can be promoted, and the high-speed durability can be improved.

BACKGROUND ART

Cavernous resonance caused by vibration of air filled in a tire cavity is one cause of tire noise. This cavernous resonance occurs when a tread portion of a tire that contacts a road surface vibrates due to unevenness of the road surface when a vehicle is driven, and this vibration vibrates the air in the tire cavity. Because, among the cavernous resonance, sound in a particular frequency band is perceived as noise, it is important to reduce the level of noise in the frequency band from the perspective of reducing the tire noise.

As a method for reducing the noise caused by the cavernous resonance, it is proposed to mount a sound absorbing member made of a porous material such as sponge on an inner circumferential surface of a tread portion on a tire inner surface with an elastic band (for example, see Japan Patent No. 4281874). However, in a case where the sound absorbing member is fixed to the tire inner surface with the elastic band, there is a problem in that the elastic band is deformed when a vehicle is driven at high speeds.

As a countermeasure, a method of causing a band-like sound absorbing member to be directly bonded to and fixed to the tire inner surface is proposed (for example, see Japan Patent No. 5267288). However, in this case, since the band-like sound absorbing member is directly bonded to the tire inner surface, heat is accumulated in the tread portion. A problem thus arises in which the accumulated heat causes degradation of high-speed durability. Further, when the band-like sound absorbing member is directly bonded to the tire inner surface, a problem further arises in which the band-like sound absorbing member cannot be deformed in accordance with deflection of the tire and is broken when the tire rolls.

Meanwhile, when cuts are formed in the inner circumferential surface of the band-like sound absorbing member, the band-like sound absorbing member can be deformed in accordance with deformation of the tire when the tire rolls. However, the tension of the band-like sound absorbing member in the circumferential direction is generated by an increase in outer diameter of the tire at the time of inflation of the tire, and cannot sufficiently be alleviated. A problem thus arises in which the band-like sound absorbing member is liable to be peeled off.

SUMMARY

The present technology provides a pneumatic tire which has cuts formed in an outer circumferential surface of a band-like sound absorbing member bonded to a tire inner surface so that the band-like sound absorbing member can be deformed in accordance with an increase in outer diameter of the tire at the time of inflation of the tire, the tension generated in the band-like sound absorbing member can be alleviated, the durability of the band-like sound absorbing member can be improved, the heat dissipation from the band-like sound absorbing member can be promoted, and the high-speed durability can be improved.

A pneumatic tire according to an embodiment of the present technology includes a tread portion having an annular shape and extending in a tire circumferential direction, a pair of sidewall portions disposed on both sides of the tread portion, a pair of bead portions disposed on inner sides of the pair of sidewall portions in a tire radial direction, and a band-like sound absorbing member bonded to an inner surface of the tread portion along the tire circumferential direction. The band-like sound absorbing member includes a plurality of cuts in an outer circumferential surface of the band-like sound absorbing member. At least one end of each of the plurality of cuts terminates within the band-like sound absorbing member.

In the present technology, the plurality of cuts are formed in the outer circumferential surface of the band-like sound absorbing member, and at least one end of each of the cuts terminates within the band-like sound absorbing member. Thus, when an outer diameter of the tire increases at the time of inflation of the tire, the cuts of the band-like sound absorbing member are opened. Accordingly, the band-like sound absorbing member can be deformed in accordance with deformation of the tire, the tension generated in the band-like sound absorbing member can be alleviated, and adhesiveness between the band-like sound absorbing member and a tire inner surface can be improved. With this structure, the durability of the band-like sound absorbing member can be improved. Further, when the cuts of the band-like sound absorbing member are opened at the time of inflation of the tire, a heat dissipation area of the band-like sound absorbing member increases. Thus, the heat dissipation from the band-like sound absorbing member can be promoted, and the high-speed durability of the pneumatic tire can be improved. Further, at least one end of each of the cuts terminates within the band-like sound absorbing member. Thus, movement of the band-like sound absorbing member can be regulated, and rubbing between parts of the band-like sound absorbing member can be suppressed.

In the present technology, both ends of each of the plurality of cuts preferably terminate within the band-like sound absorbing member. With this structure, the rubbing between the parts of the band-like sound absorbing member can be suppressed further effectively.

In the present technology, the angle θ of the plurality of cuts with respect to the tire circumferential direction preferably ranges from 40° to 90°. With this structure, when the outer diameter of the tire increases at the time of inflation of the tire, the cuts of the band-like sound absorbing member are opened so that the band-like sound absorbing member can be deformed in accordance with the deformation of the tire, the tension generated in the band-like sound absorbing member can be alleviated, and the adhesiveness between the band-like sound absorbing member and the tire inner surface can be improved. Further, the heat dissipation from the band-like sound absorbing member can be promoted, and the high-speed durability of the pneumatic tire can be improved.

In the present technology, a depth d of the plurality of cuts is preferably equal to or greater than 20% of a thickness D of the band-like sound absorbing member. Further, the maximum value of the cut depth d is preferably equal to or less than 90%, and more preferably equal to or less than 55%. With this structure, when the outer diameter of the tire increases at the time of inflation of the tire, the cuts of the band-like sound absorbing member are opened so that the heat dissipation from the band-like sound absorbing member can be promoted, and the high-speed durability of the pneumatic tire can be improved.

In the present technology, a width a of the plurality of cuts of the band-like sound absorbing member is preferably from 40% to 90% of a width A of the band-like sound absorbing member. This structure contributes to the deformation of the band-like sound absorbing member in accordance with the increase in outer diameter of the tire at the time of inflation of the tire, the alleviation of the tension generated in the band-like sound absorbing member, the improvement of the durability of the band-like sound absorbing member, the promotion of the heat dissipation from the band-like sound absorbing member, and the improvement of the high-speed durability of the tire.

In an embodiment of the present technology, the volume of the band-like sound absorbing member is preferably from 10% to 30% of the cavity volume of the tire. With this structure, a sound absorbing effect by the band-like sound absorbing member can be further obtained. By increasing the volume of the band-like sound absorbing member in this manner, an excellent noise reduction effect can be obtained, and moreover a satisfactory tension alleviation effect and a heat dissipation effect can be enhanced even with a large band-like sound absorbing member. The cavity volume is the volume of the cavity portion formed between the tire and a rim under a state in which the tire is mounted on a regular rim and inflated to a regular internal pressure. "Regular rim" is a rim defined by a standard for each tire according to a system of standards that includes standards on which tires are based, and refers to a "standard rim" in the case of the Japan Automobile Tyre Manufacturers Association (JATMA), refers to a "Design Rim" in the case of the Tire and Rim Association (TRA), and refers to a "Measuring Rim" in the case of the European Tyre and Rim Technical Organisation (ETRTO). However, when the tire is an original equipment tire, the volume of the space is calculated using a genuine wheel to which the tire is assembled. "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

In an embodiment of the present technology, the band-like sound absorbing member preferably has a missing portion at at least one position in the tire circumferential direction. With this structure, the band-like sound absorbing member is capable of tolerating shearing strain at the bonding surface due to expansion caused by the tire inflation for a long period of time.

BRIEF DESCRIPTION OF DRAWINGS

FIG. 5A to FIG. 5E are developed views of a part of the bonding surface in the modified examples.

DETAILED DESCRIPTION

Figure 1:
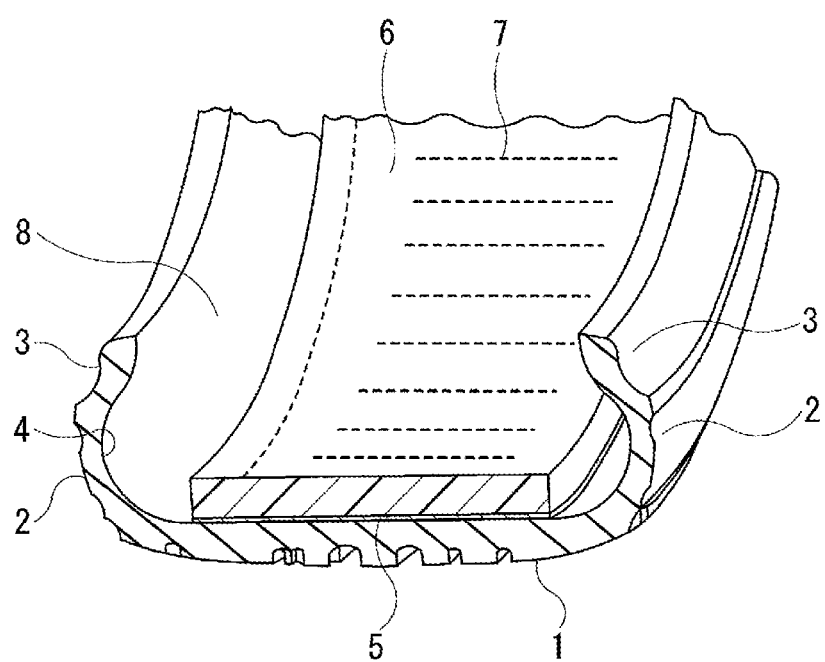
FIG. 1 is a perspective cross-sectional view of a pneumatic tire according to an embodiment of the present technology.
Figure 2:
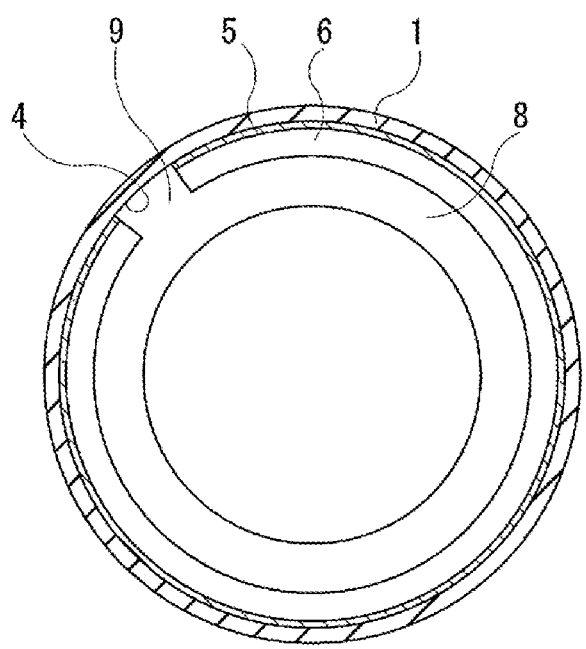
FIG. 2 is a cross-sectional view taken along the equator line of a pneumatic tire according to the embodiment of the present technology.

Configuration of embodiments of the present technology are described in detail below with reference to the accompanying drawings. FIGS. 1 to 2 are views illustrating a pneumatic tire according to an embodiment of the present technology. In FIG. 1, the pneumatic tire according to the present embodiment includes an annular tread portion 1 extending in the tire circumferential direction, a pair of sidewall portions 2 disposed on both sides of the tread portion 1, and a pair of bead portions 3 disposed on an inner side of the sidewall portions 2 in the tire radial direction.

In the pneumatic tire described above, a band-like sound absorbing member 6 is bonded along the tire circumferential direction to a region of a tire inner surface 4 corresponding to the tread portion 1, with an adhesive layer 5 therebetween. The band-like sound absorbing member 6 is formed of a porous material with open cells, and has predetermined sound absorbing properties based on the porous structure. Polyurethane foam is preferably used as the porous material of the band-like sound absorbing member 6. Meanwhile, a double-sided adhesive tape is preferably used as the adhesive layer 5.

A plurality of cuts 7 extending in the tire width direction are formed in an outer circumferential surface of the band-like sound absorbing member 6, that is, a bonding surface with the tire. Further, both ends of each of the cuts 7 terminate within the band-like sound absorbing member 6, and do not reach both ends of the band-like sound absorbing member 6 in the width direction. One end of each of the cuts 7 may terminate within the band-like sound absorbing member 6, and only the other end of each of the cuts 7 may reach the end of the band-like sound absorbing member 6.

In the pneumatic tire described above, the plurality of cuts 7 are formed in the outer circumferential surface of the band-like sound absorbing member 6, and at least one end of each of the cuts 7 terminate within the band-like sound absorbing member 6. Thus, when an outer diameter of the tire increases at the time of inflation of the tire, the cuts 7 of the band-like sound absorbing member 6 are opened so that the band-like sound absorbing member 6 can be deformed in accordance with the deformation of the tire, the tension generated in the band-like sound absorbing member 6 can be alleviated, and adhesiveness between the band-like sound absorbing member 6 and the tire inner surface 4 can be improved. Particularly, when the tire is significantly deflected, breakage is liable to occur at an interface between the band-like sound absorbing member 6 and the adhesive layer 5. However, forming the cuts 7 in the band-like sound absorbing member 6 allows such breakage to be effectively prevented. With this structure, the durability of the band-like sound absorbing member 6 can be improved. Further, at the time of inflation of the tire, the cuts 7 of the band-like sound absorbing member 6 are opened so that a heat dissipation area of the band-like sound absorbing member 6 increases. Thus, the heat dissipation from the band-like sound absorbing member 6 can be promoted, and the high-speed durability of the pneumatic tire can be improved. Further, both the ends of each of the cuts 7 terminate within the band-like sound absorbing member 6. Thus, movement of the band-like sound absorbing member 6 can be regulated, and rubbing between parts of the band-like sound absorbing member 6 can be suppressed.

Figure 3:
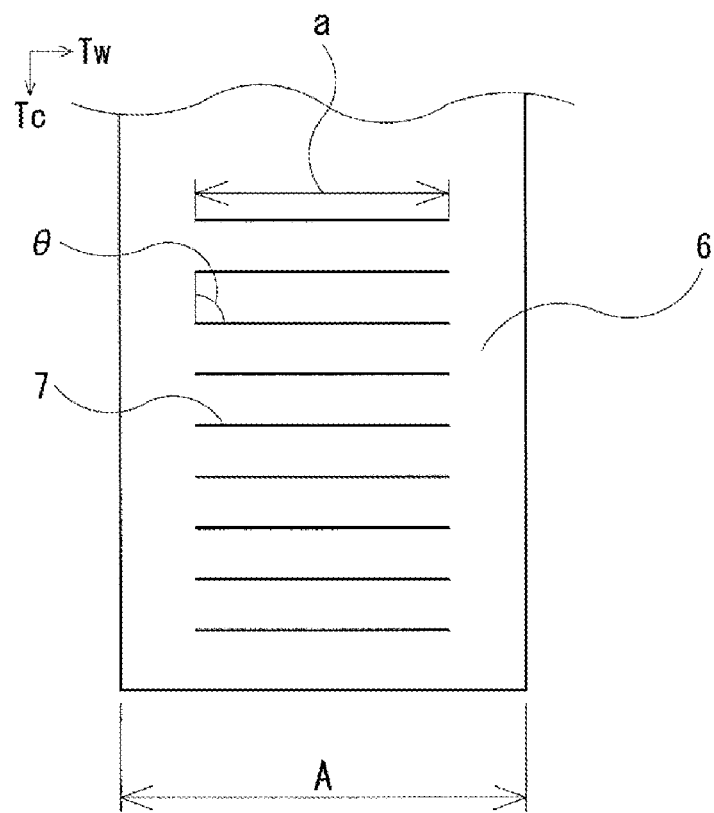
FIG. 3 is a developed view of a part of a band-like sound absorbing member on a bonding surface side to be bonded to an inner surface of a pneumatic tire according to the present technology.

As illustrated in FIG. 3, an angle θ is an angle of the cut 7 with respect to the tire circumferential direction. Note that, in FIG. 3, Tc indicates the tire circumferential direction, and Tw indicates the tire width direction. In this case, the angle θ of the cut 7 with respect to the tire circumferential direction ranges from 40° to 90°. By appropriately setting the angle θ as described above, the cuts 7 of the band-like sound absorbing member 6 are opened at the time of inflation of the tire so that the band-like sound absorbing member 6 can be deformed in accordance with the deformation of the tire, the tension generated in the band-like sound absorbing member 6 can be alleviated, and the adhesiveness between the band-like sound absorbing member 6 and the tire inner surface 4 can be improved. Further, the heat dissipation from the band-like sound absorbing member 6 can be promoted, and the high-speed durability of the pneumatic tire can be improved. Here, when the angle θ is excessively small, the cuts 7 are not easily opened at the time of inflation of the tire. Thus, the tension alleviation effect and the heat dissipation effect described above are reduced.

Further, in FIG. 3, a width a is a width of the cut 7, and a width A is a width of the band-like sound absorbing member 6. In this case, the width a of the cut 7 of the band-like sound absorbing member 6 is from 40% to 90% of the width A of the band-like sound absorbing member 6. Particularly, the width a of the cut 7 of the band-like sound absorbing member 6 preferably ranges from 50% to 80% of the width A of the band-like sound absorbing member 6. Setting the width a to a suitable size with respect to the width A contributes to the deformation of the band-like sound absorbing member 6 in accordance with the increase in outer diameter of the tire at the time of inflation of the tire, the alleviation of the tension generated in the band-like sound absorbing member 6, the improvement of the durability of the band-like sound absorbing member 6, the promotion of the heat dissipation from the band-like sound absorbing member 6, and the improvement of the high-speed durability of the tire. Here, when the width a of the cut 7 is excessively large, the band-like sound absorbing member 6 is less likely to be stable. Thus, the improvement effect on the durability of the band-like sound absorbing member 6 is reduced.

Figure 4:
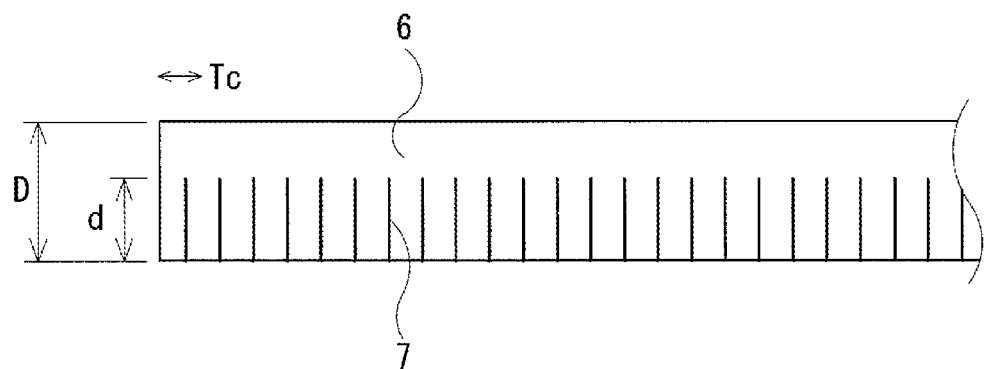
FIG. 4 is a cross-sectional view of the sound absorbing member of FIG. 3 in a tire circumferential direction.

FIG. 4 is a cross-sectional view of the band-like sound absorbing member 6 in the tire circumferential direction. The cuts 7 are opened only on the outer circumferential surface (the bonding surface with the tire) of the band-like sound absorbing member 6, and are not opened on the inner circumferential surface of the band-like sound absorbing member 6. A depth d is a depth of the cut 7, and a thickness D is a thickness of the band-like sound absorbing member 6. In this case, the depth d of the cut 7 is equal to or greater than 20% of the thickness D of the band-like sound absorbing member 6. The maximum value of the depth d of the cut 7 is preferably equal to or less than 90%, and more preferably equal to or less than 55%. Setting the depth d to a suitable size with respect to the thickness D as described above enables the cuts 7 of the band-like sound absorbing member 6 to be opened at the time of inflation of the tire and the heat dissipation from the band-like sound absorbing member 6 to be promoted. Here, the depth d of the cut 7 is excessively shallow, and the heat dissipation from the band-like sound absorbing member 6 becomes slow. Thus, the high-speed durability of the tire is degraded.

In the pneumatic tire described above, the volume of the band-like sound absorbing member 6 is from 10% to 30% of the cavity volume of the tire. Further, the width of the band-like sound absorbing member 6 is from 30% to 90% of a tire ground contact width. As described above, by suitably setting the volume and the width of the band-like sound absorbing member 6, the sound absorbing effect exerted by the band-like sound absorbing member 6 can further be obtained. Here, when the volume of the band-like sound absorbing member 6 is less than 10% of the cavity volume of the tire, the sound absorbing effect cannot be appropriately obtained. Further, when the volume of the band-like sound absorbing member 6 exceeds 30% of the cavity volume of the tire, the reduction effect for the noise caused by the cavernous resonance becomes constant, and the further reduction effect cannot be expected.

Further, as illustrated FIG. 2, the band-like sound absorbing member 6 has a missing portion 9 at one position in the tire circumferential direction. The missing portion 9 is a portion in which the band-like sound absorbing member 6 is not present on the tire circumference. Forming the missing portion 9 in the band-like sound absorbing member 6 allows the band-like sound absorbing member 6 to tolerate shearing strain at the bonding surface due to expansion caused by the tire inflation for a long period of time, and the shearing strain created at the bonding surface of the band-like sound absorbing member 6 can be effectively alleviated. One or three to five missing portions 9 described above may be formed. That is, when two missing portions 9 are formed on the tire circumference, tire uniformity is significantly degraded due to mass unbalance. When six or more missing portions 9 are formed on the tire circumference, manufacturing cost is significantly increased.

Note that, when two or more missing portions 9 are formed on the tire circumference, the band-like sound absorbing member 6 is intermittent in the tire circumferential direction. Even in such case, for example, a plurality of band-like sound absorbing members 6 are coupled to each other by other laminating objects such as the adhesive layer 5 formed of a double-sided adhesive tape so that these band-like sound absorbing members 6 can be handled as an integrated member. Thus, bonding work to the tire inner surface 4 can be facilitated.

Figure 5A:
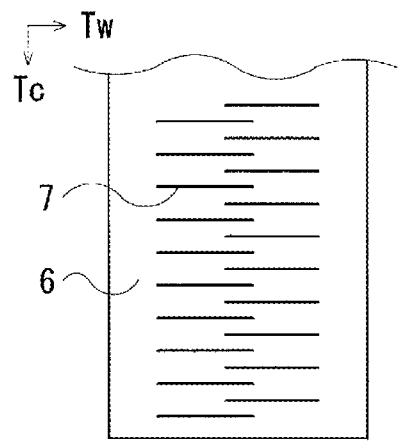
FIG. 5A to FIG. 5E are views of modified examples of cuts of a band-like sound absorbing member to be bonded to the inner surface of a pneumatic tire according to the present technology.
Figure 5B:
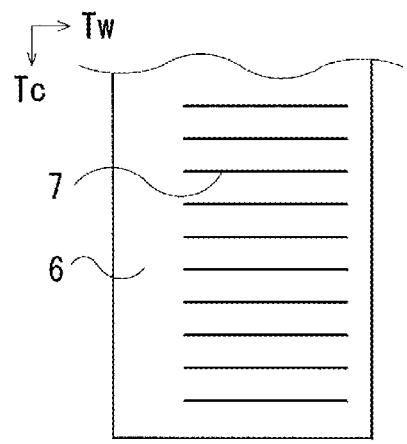
Figure 5C:
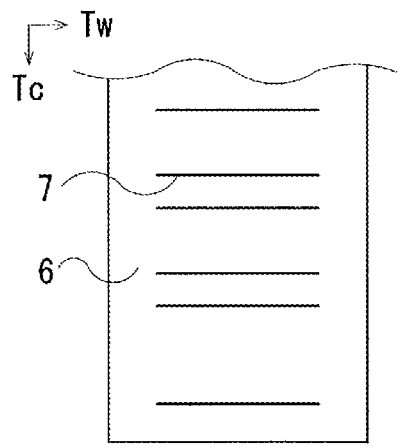
Figure 5D:
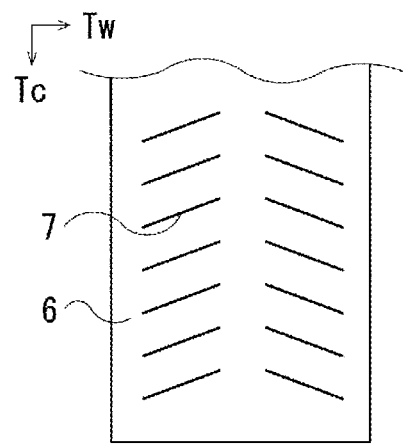
Figure 5E:
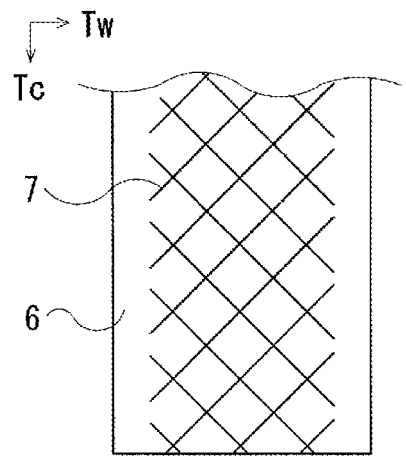

As the cuts 7, in addition to the case illustrated in FIG. 1, the following cases can be exemplified: the cuts 7 disposed alternately as illustrated in FIG. 5A; the cuts 7 disposed on one side of the band-like sound absorbing member 6 as illustrated in FIG. 5B; and the cuts 7 disposed randomly as illustrated in FIG. 5C. Further, the following cases are exemplified: the cuts 7 disposed alternately and obliquely as illustrated in FIG. 5D; and the cuts 7, which extend in two directions, disposed intersecting with each other as illustrated in FIG. 5E.

The present technology is further described below by examples. However, the scope of the present technology is not limited to these examples.

EXAMPLES

Each pneumatic tire had a tire size of 275/34ZR20, and included an annular tread portion extending in a tire circumferential direction, a pair of sidewall portions disposed on both sides of the tread portion, and a pair of bead portions disposed on an inner side of the sidewall portions in the tire radial direction. In such pneumatic tire, a band-like sound absorbing member was bonded to an inner surface of the tread portion along the tire circumferential direction. Presence or absence of cuts, disposition of the cuts, a cut angle θ, a cut depth (the depth d/the thickness D×100%), and a cut width (the width a/the width A×100%) of each pneumatic tire were set as shown in Table 1 and Table 2. In this manner, the tires of Conventional Example, Comparative Examples, and Examples 1 to 12 were manufactured.

These test tires were evaluated for the high-speed durability and the durability of the band-like sound absorbing member in a high deflection state according to the following evaluation methods, and the results thereof are shown in Table 1 and Table 2.

In Table 1 and Table 2, regarding the disposition of the cuts, "reaching" indicates a state in which the cuts formed in the outer circumferential surface of the band-like sound absorbing member reach both ends of the band-like sound absorbing member in the width direction, and "not reaching" indicates a state in which the cuts do not reach both the ends of the band-like sound absorbing member in the width direction.

High-Speed Durability:

Each test tire was assembled on a wheel having a rim size of 20×9 ½J, and subjected to a running test on a drum testing machine under testing conditions of an air pressure of 360 kPa and a load of 5 kN. Specifically, a speed at the initial state was set to 250 km/h, and increased by 10 km/h every 20 minutes, and the tires were caused to run until failures occurred to the tires. The steps (speeds) at which the failures occurred were measured. The results are shown in Table 1 and Table 2.

Durability of Band-Like Sound Absorbing Member in High Deflection State:

The durability referred herein is evaluation mainly for rubbing between parts of the band-like sound absorbing member. Each test tire was assembled on a wheel having a rim size of 20×9 ½J, and subjected to a running test on a drum testing machine under testing conditions of a speed of 80 km/h, an air pressure of 160 kPa, a load of 8.5 kN, and a running distance of 6000 km, after which the presence or absence of the rubbing between the parts of the band-like sound absorbing member was visually confirmed. The results are shown in Table 1 and Table 2. In the items described above, "excellent" indicates a case where no rubbing between the parts of the band-like sound absorbing member was confirmed, "good" indicates a case where rubbing between the parts of the band-like sound absorbing member was confirmed in an area smaller than one eighth of the entire band-like sound absorbing member, "fair" indicates a case where rubbing between the parts of the band-like sound absorbing member was confirmed in an area equal to or larger than one eighth but smaller than a quarter of the entire band-like sound absorbing member, and "poor" indicates a case where rubbing between the parts of the band-like sound absorbing member was confirmed in an area equal to or larger than a quarter of the entire band-like sound absorbing member.

TABLE 1

|  | Conventional Example | Comparative Example | Example 1 | Example 2 | Example 3 | Example 4 | Example 5 |
| --- | --- | --- | --- | --- | --- | --- | --- |
| Presence or absence of the cuts | Absent | Present | Present | Present | Present | Present | Present |
| Disposition of the cuts | — | Reaching | Not reaching | Not reaching | Not reaching | Not reaching | Not reaching |
| Cut angle θ | — | 35° | 35° | 40° | 65° | 90° | 90° |
| Cut depth (depth d/ thickness D × 100%) | — | 15% | 15% | 15% | 15% | 15% | 20% |
| Cut width (width a/ width A × 100%) | — | 25% | 25% | 25% | 25% | 25% | 25% |
| High-speed Durability | 310 km/h | 320 km/h | 320 km/h | 330 km/h | 330 km/h | 330 km/h | 340 km/h |
| Durability of the band-like sound absorbing member in the high deflection state | — | Fair | Good | Good | Good | Good | Good |

TABLE 2

|  | Example 6 | Example 7 | Example 8 | Example 9 | Example 10 | Example 11 | Example 12 |
| --- | --- | --- | --- | --- | --- | --- | --- |
| Presence or absence of the cuts | Present | Present | Present | Present | Present | Present | Present |
| Disposition of the cuts | Not reaching | Not reaching | Not reaching | Not reaching | Not reaching | Not reaching | Not reaching |
| Cut angle θ | 90° | 90° | 90° | 90° | 90° | 90° | 90° |
| Cut depth (depth d/ thickness D × 100%) | 55% | 90% | 55% | 55% | 55% | 55% | 55% |
| Cut width (width a/ width A × 100%) | 25% | 25% | 35% | 40% | 65% | 90% | 95% |

TABLE 2-continued

|  | Example 6 | Example 7 | Example 8 | Example 9 | Example 10 | Example 11 | Example 12 |
|---|---|---|---|---|---|---|---|
| High-speed Durability | 340 km/h | 340 km/h | 340 km/h | 350 km/h | 350 km/h | 350 km/h | 350 km/h |
| Durability of the band-like sound absorbing member in the high deflection state | Excellent | Excellent | Excellent | Excellent | Excellent | Excellent | Good |

As apparent from Table 1 and Table 2, in the pneumatic tires of Examples 1 to 12, the high-speed durability and the durability of the band-like sound absorbing member in the high deflection state were improved at the same time.

In contrast, in Comparative Example, because the cuts were formed so as to reach both the ends of the band-like sound absorbing member in the width direction, an improvement effect for the durability of the band-like sound absorbing member in the high deflection state was not sufficient.

The invention claimed is:

1. A pneumatic tire, comprising:
   a tread portion having an annular shape and extending in a tire circumferential direction;
   a pair of sidewall portions disposed on both sides of the tread portion;
   a pair of bead portions disposed on inner sides of the pair of sidewall portions in a tire radial direction; and
   a band shaped sound absorbing member having an outer circumferential surface bonded to an inner surface of the tread portion along the tire circumferential direction,
   wherein the band shaped sound absorbing member includes a plurality of cuts in the outer circumferential surface of the band shaped sound absorbing member,
   both ends of each of the plurality of cuts terminates within the band shaped sound absorbing member,
   the plurality of cuts open only on an outer circumferential surface of the band shaped sound absorbing member and do not open on an inner circumferential surface of the band shaped sound absorbing member, and
   the plurality of cuts have a closed state which transitions to an open state at a time of inflation of the pneumatic tire.

2. The pneumatic tire according to claim 1, wherein a depth d of the plurality of cuts is at least 20% of a thickness D of the band shaped sound absorbing member.

3. The pneumatic tire according to claim 1, wherein a width a of the plurality of cuts of the band shaped sound absorbing member is from 40% to 90% of a width A of the band shaped sound absorbing member.

4. The pneumatic tire according to claim 1, wherein a volume of the band shaped sound absorbing member is from 10% to 20% of a cavity volume of the pneumatic tire.

5. The pneumatic tire according to claim 1, wherein the band shaped sound absorbing member includes a missing portion at at least one position in the tire circumferential direction.

6. The pneumatic tire according to claim 1, wherein an angle θ of the plurality of cuts with respect to the tire circumferential direction ranges from 40° to 90°.

7. The pneumatic tire according to claim 6, wherein a depth d of the plurality of cuts is at least than 20% of a thickness D of the band shaped sound absorbing member.

8. The pneumatic tire according to claim 7, wherein a width a of the plurality of cuts of the band shaped sound absorbing member is from 40% to 90% of a width A of the band shaped sound absorbing member.

9. The pneumatic tire according to claim 8, wherein a volume of the band shaped sound absorbing member is from 10% to 30% of a cavity volume of the pneumatic tire.

10. The pneumatic tire according to claim 9, wherein the band shaped sound absorbing member includes a missing portion at at least one position in the tire circumferential direction.

* * * * *